United States Patent [19]

Lee et al.

[11] 3,895,308

[45] July 15, 1975

[54] MICROWAVE FREQUENCY AMPLIFIER CONSTRUCTED UPON A SINGLE FERRITE SUBSTRATE

[75] Inventors: Chong Won Lee; Wei Ching Tsai, both of Lexington, Mass.

[73] Assignee: Raytheon Company, Lexington, Mass.

[22] Filed: May 17, 1973

[21] Appl. No.: 361,098

[52] U.S. Cl. ............. 330/38 M; 330/53; 333/84 M; 333/73 S; 330/56

[51] Int. Cl. .............................................. H03f 3/14

[58] Field of Search ........... 333/73 S, 84 M; 330/53, 330/56

[56] References Cited

UNITED STATES PATENTS

| | | | |
|---|---|---|---|
| 3,284,717 | 11/1966 | Damiono et al. | 330/56 X |
| 3,577,181 | 5/1971 | Belohoubek | 333/84 M |
| 3,631,358 | 12/1971 | Ayaki | 330/38 M X |
| 3,646,467 | 2/1972 | Smith | 330/53 |
| 3,764,938 | 10/1973 | Barnes | 333/73 S |
| 3,786,375 | 1/1974 | Sato et al. | 333/84 M |

*Primary Examiner*—Nathan Kaufman
*Attorney, Agent, or Firm*—David M. Warren; Joseph D. Pannone; Milton D. Bartlett

[57] ABSTRACT

A compact high power microwave frequency amplifier is constructed entirely upon a single ferrite substrate. Negative resistance diodes, mounted directly in the ferrite substrate using low capacitance techniques, form the amplifying devices. A number of similar amplifying stages may be joined onto a single substrate or divided into a number of similar substrates and used to advantage in phased array radar systems and in microwave communication systems because of their superior phase stability characteristics.

6 Claims, 6 Drawing Figures

MICROWAVE FREQUENCY AMPLIFIER CONSTRUCTED UPON A SINGLE FERRITE SUBSTRATE

BACKGROUND OF THE INVENTION

Producing compact yet powerful microwave signal amplifiers has long been a problem. In many prior art amplifiers, the circuit was constructed upon a ceramic substrate including a microwave circulator or other ferrite component mounted into the ceramic substrate. This type of construction suffered from power losses in that impedance mismatch conditions occurred at the boundaries between the ferrite material and the ceramic material. Prior art attempts to solve this problem have included those where the ferrite component was constructed by depositing appropriate metallized patterns upon the surface of a continuous ferrite substrate wherein the ferrite extends beyond the boundaries of the actual circulator. In such attempts, the amplifying means was still constructed upon a separate ceramic substrate which was mounted separately from the ferrite substrate upon which the microwave circulator was constructed. Although such attempts may, in some cases, have reduced the number of interconnection points at which a mismatch could occur, there still were mismatches between connections where signals were transferred from ferrite material to ceramic material. Furthermore, the overall space required for the amplifier was increased as two different substrates had to be used. Also, the phase shifts and electrical lengths of devices using both ceramic and ferrite substrates tended to be somewhat difficult to predict and control accurately because of the impedance mismatches internally built into the devices. Mechanical stress on interconnecting members is a problem between ceramic and ferrite materials because of the typically non-identical coefficients of thermal expansion of the two materials. Moreover, the cost of such amplifiers is obviously increased as a multiplicity of substrates must be used necessitating further steps and processes in the manufacture of microwave amplifiers. These problems of prior art devices, as well as others, made them both cumbersome and expensive to use in such large systems as phased array radar systems wherein a thousand or more such amplifiers are typically used in a single radar installation.

SUMMARY OF THE INVENTION

Accordingly, it is an object of the present invention to provide a microwave signal amplifier wherein internal impedance mismatches are minimized.

Furthermore, it is an object of the present invention to provide a negative resistance diode amplifier wherein the capacitance between the diode and the surrounding substrate is minimized and the inductances in the leads to the diode are minimized.

It is also an object of the present invention to provide a microwave signal amplifier constructed upon a single continuous ferrite substrate.

These, as well as other objects, may be achieved by providing the combination of a sheet of ferrite material and a means for amplifying signals located contiguous to the ferrite sheet wherein the amplifying means may or may not be in physical contact with the ferrite sheet. Preferably, the combination includes means for coupling signals to and from the amplifying means which may be a plurality of strip conductors located upon one or more surfaces of the ferrite sheet. A circulator which may also be included as part of the combination and comprises a substantially round metallized region located upon the surface of the ferrite sheet with a means for producing a magnetic field, which may be a permanent magnet, substantially perpendicular to the ferrite sheet. The circulator includes a plurality of ports comprising other metallized regions for coupling signals to and from the circulator. In the preferred embodiment, the amplifying means comprises a negative resistance diode such as an avalanche diode or a Gunn diode. This diode may be located within a hole in the ferrite sheet, and to reduce the capacitance between the diode and the ferrite sheet, the center of the diode may be displaced from the center of the hole. The combination may further include other strip conductors to couple the diode to the circulator as well as other metallized regions for matching the impedance of the diode to the impedance of the circulator and the other components. Means may be provided for biasing the diode into the appropriate negative resistance region of operation for the particular frequencies of interest. The ferrite sheet may be mounted upon an underlying substrate such as a copper mounting base. The invention, as described above, may be used to advantage in a phased array radar system or in a microwave communication system.

DESCRIPTION OF THE PREFERRED EMBODIMENTS

Figure 1:
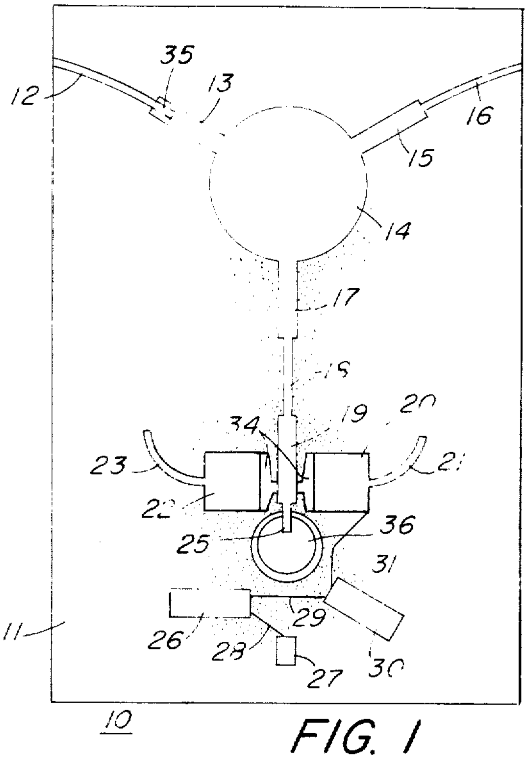
FIG. 1 is a plan view of a single stage of a microwave amplifier constructed in accordance with the present invention.
Figure 4:
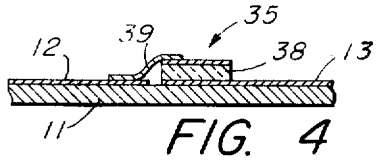
FIG. 4 is a cross-sectional view of the coupling capacitor and connections to it shown in FIG. 1.

FIG. 1 shows a plan view of a microwave signal amplifier shown generally at 10 constructed upon a single ferrite substrate 11. The ferrite substrate may, for example, be composed of Trans Tech G1010 YIG (yttrium iron garnet) material 40 mils in thickness with a relative dielectric constant of 15 and a saturation magnetization of 1000 gauss. The amplifier as described is designed to operate around a center frequency of 5.3 gHz but other frequencies can be used by simply varying the appropriate dimensions of the metallized components and the relative dielectric constant and saturation magnetization. In the preferred embodiment, the signal to be amplified is conducted along microstrip line 12 through ceramic capacitor 35 to the quarter wavelength section of microstrip line 13 which forms the input port for the incoming microwave signal to the microwave circulator 14. The details of the construction of ceramic capacitor 35 are shown in FIG. 4 and will be discussed in connection with that figure. The metallization patterns, including the microstrip lines and the metallized portion of the ferrite circulator 14, are fromed by depositing a lower layer of chrome and an upper layer of gold on top of the substrate 11 and then etching away the metal so as to leave the desired pattern. Resistors are formed by etching away the upper layer of gold leaving the lower layer of the higher resistivity chrome. The microwave circulator 14 is constructed by plating a circle of gold plated copper upon the surface of the ferrite substrate 11. In the preferred embodiment, the diameter of the circle is 0.325 inches. A permanent magnet is positioned beneath the substrate 11 with its magnetic field extending perpendicular to the surface of the substrate 11 thereby causing the signals propagating from port 13 to be conducted to port 17. Similarly, the signals propagating out of port 17 are conducted to port 15. Ports 13, 15 and 17 are all quarter wavelength segments which in the preferred embodiment are 0.180 inches in length while the widths are all 0.053 inches. The actual operation of the circulator is by the same physical phenomena such as for a conventional ferrite circulator.

Once the incoming signal to be amplified has been conducted to port 17, it propagates along metallized quarter wavelength strips 18 and 19 to the negative resistance amplifier diode 36. Strips 18 and 19 each have a preferred length of 0.180 inches and widths of 0.022 inches and 0.065 inches. Metallized areas 20, 21, 22, and 23 are used to match the impedance of the diode to the microstrip line impedances. Their dimensions in the preferred embodiment are 0.160 inches for the length and 0.122 inches for the width of sections 20 and 22 and 0.122 inches in width for sections 21 and 23 with a radius of 0.108 inches. Sections 34 and 4 ohms thin film resistors formed by etching away the upper gold layer. The techniques used here to match the impedance characteristics of the negative resistance diode 36 to the microstrip transmission lines to which it is coupled so as to have a broadband response is described by W. J. Gettsinger in "Prototypes for Use in Broadbanding Reflection Amplifiers", IEEE Transactions on Microwave Theory and Techniques, pages 486 through 497, November 1963. Bias to the diode is supplied along transmission line sections 28, 26, 29, 30, and 31. These sections are alternately high impedance, low impedance, high impedance, low impedance and finally high impedance respectively so as to prevent the flow of microwave signal energy back into the DC power source which is here coupled to the circuit on pad 27. The respective dimensions of these sections in the preferred embodiment are 0.180 inches for the length and 0.005 inches for the width of section 31, 0.165 inches for the length and 0.070 inches for the width of both sections 26 and 30, 0.180 inches for the length and 0.005 inches for the width of both sections 26 and 30, and 0.070 inches for the length and 0.060 inches for the width of pad 27. After being amplified by diode 36 through its negative resistance characteristics, the signal flows back through sections 19, 18 and 17 to port 17 of microwave circulator 14 where the signal is directed to output port 15 and finally to output microstrip line 16. Also, the entire ferrite substrate is preferably mounted upon an underlying copper ground plane which is not shown here in FIG. 1 but may be seen in the views of FIGS. 2 and 3 at 26.

Figure 2:
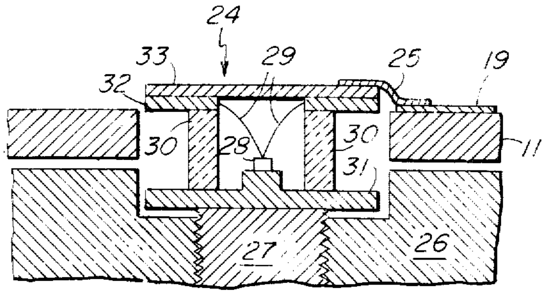
FIG. 2 is a sectional view of the mounting of the amplifier diode in the device of FIG. 1.
Figure 3:
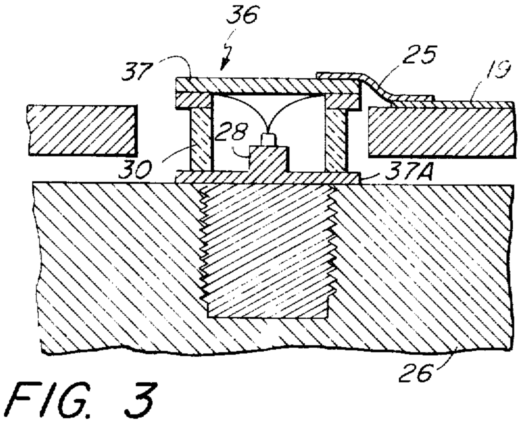
FIG. 3 is an alternative method of mounting the diode of FIG. 2.

In FIGS. 2 and 3 are shown alternative ways of mounting the diode 36 in the ferrite substrate 11. It is to be noted that using the ferrite substrate, prior art methods of diode mounting will not suffice in that the upper metal top of the diode, which forms the connection to the cathode of the diode, would extend over the substrate which has a high dielectric constant compared to ceramic materials. Here, however, if the top of the diode were to extend over the ferrite substrate 11, an undesirably large capacitance would be created between the top and substrate 11. In FIG. 2 a hole is drilled through the ferrite substrate 11 into the underlying copper ground plane 26. The top 33 of the conventional diode 24 falls short by a uniform spacing around the edge of the hole drilled in the ferrite substrate 11 and does not extend over it. Therefore, very little capacitance is created between the diode top 33 and ferrite substrate 11 since the overlap, as in the prior art has been eliminated. Here the connection to the diode is made from microstrip line 19 to the top 33 through connecting tab 25. All of these components are preferably gold plated on their exposed metal surfaces to provide a high degree of conductivity between connecting parts and to minimize the microwave power loss. As in other conventional type diodes, the diode chip 28 is connected to the top 33 through leads 29. The diode chip 28 is mounted atop mounting stud 27 which is threaded and screwed into the underlying copper base 26. Cylindrical ceramic support 30 separates the mounting stud 27 from the top 33. As shown in FIG. 2, the hole drilled into copper base 26 is countersunk to accommodate the lower flange 31 of the diode 24.

In FIG. 3 is shown an alternate diode construction and mounting. Here, the top 37 and lower flange 37A are smaller in diameter than the conventional diode and the hole in which the diode 36 is mounted is larger. Also, the diode is mounted offcenter so that the edge of the top 37 is in near proximity to the edge ferrite substrate 11 at the point where the connecting tab 25 bridges the gap between the microstrip line 19 and diode top 37. Therefore, the series inductance between the microstrip line 19 and diode top 37 is minimized. A space is left around the remainder of the periphery of the diode 36 so that the capacitance between the diode top 37 and ferrite substrate 11 is also reduced.

Figure 5:
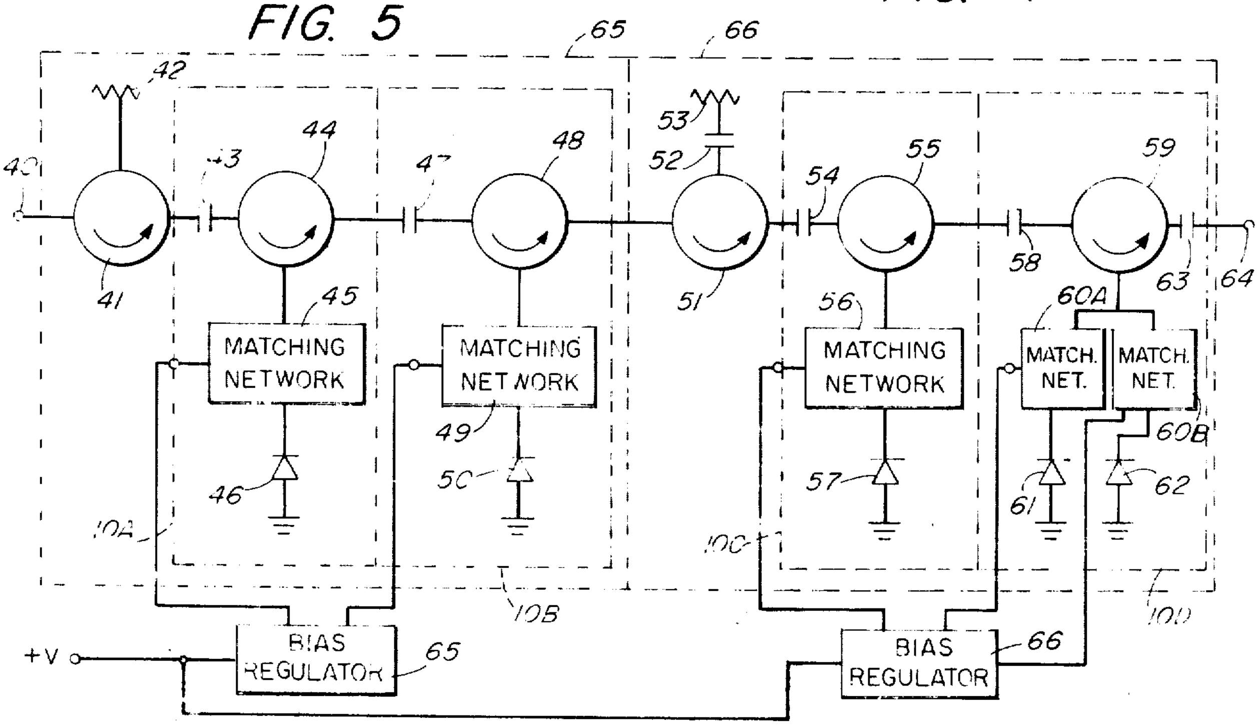
FIG. 5 is a block diagram of a multistage amplifier wherein the present invention is used to advantage.

FIG. 5 shows the block diagram of a four-stage amplifier constructed in accordance with the principles of the present invention wherein the entire amplifier may be mounted on a single ferrite substrate or a number of the amplifiers, each of which is mounted on its own separate ferrite substrate, are joined together to form a multistage amplifier. In the example shown in FIG. 5, the input signal to be amplified is coupled through input connection 40 and ferrite circulator 41 to the input of the first amplifier section outlined in dotted lines at 10A. The circulator 41 with power absorbing resistor 42 forms an isolation stage to ensure that no amplified and reflected signal is allowed to pass back into the input signal source coupled to terminal 40. Here, any reflected signal will be absorbed by resistor 42. Each of these amplifier stages 10A, 10B, and 10C are constructed in the same manner as the amplifier shown in FIG. 1 which stage 10D includes an additional amplifying diode. All of the stages may be mounted upon a single substrate. However, by way of illustration, the amplifier stages here are located in two halves 65 and 66 each with two amplifier stages. In the first stage 10A, the circulator 44 corresponds to the circulator 14 in FIG. 1 while the matching network 45 corresponds to sections of microstrip line 18 and 19 and impedance matching sections 20, 21, 22 and 23 as shown in FIG. 1. Bias regulator 65 supplies the bias current to diodes 46 and 50 in stages 10A and 10B while bias regulator 66 supplies the bias current to diodes 57, 61, and 62 in stages 10C and 10D respectively. Bias regulators 65 and 66 are conventional constant current sources which operate from an arbitrary unregulated supply voltage +V and produce as outputs the proper constant currents to reverse bias the diodes into the proper negative resistance region of operation for the frequency specified. Of course, other configurations could be used for these bias regulators. A single bias regulator could supply the bias to other groups of diodes or a separate regulator could be provided for each diode. The output from stage 10A is coupled into stage 10B which is an identical section with corresponding circulator 48, matching network 49, and diode 50. The output from stage 10B forms the output from the first half of the amplifier 65. This signal is coupled directly into the input of circulator 51 in second half 66 without the use of a coupling capacitor. Instead, a capacitor 52 is located between the reflected power output port of the circulator 51 and the power absorbing resistor 53. The main power output of the circulator 51 couples the signal thus far amplified through capacitor 54 into the input of stage 10C which is identical to stage 10A and 10B with circulator 55, matching network 56, and diode 57. Capacitors 52 and 54 may be capacitors as shown in FIG. 4. The output of stage 10C is coupled through capacitor 58 to the input of stage 10D. This section 10D is substantially the same as the sections 10A, 10B, and 10C with the exception that it uses two diodes 61 and 62 to obtain greater power for the final stage of amplification and correspondingly two matching networks 60A and 60B. The final power output of the amplifier is coupled from the output of circulator 59 through capacitor 63, which again may be a capacitor as shown in FIG. 4, to the amplifier output terminal 64.

In FIG. 4 is shown a sectional view of a capacitor 35 used in the circuits of the present invention as in the circuit of FIG. 1. A microstrip line 12 guides the input signal along the ferrite substrate 11 to the region to the left of the capacitor. A block of ceramic material 38, one quarter wavelength in overall length at the frequency of operation, is metal plated on upper and lower surfaces, preferably with gold, and mounted atop the second microstrip line 13. A connecting tab 39, preferably copper plated with gold, connects microstrip line 12 with the metallized upper surface of the capacitor.

Figure 6:
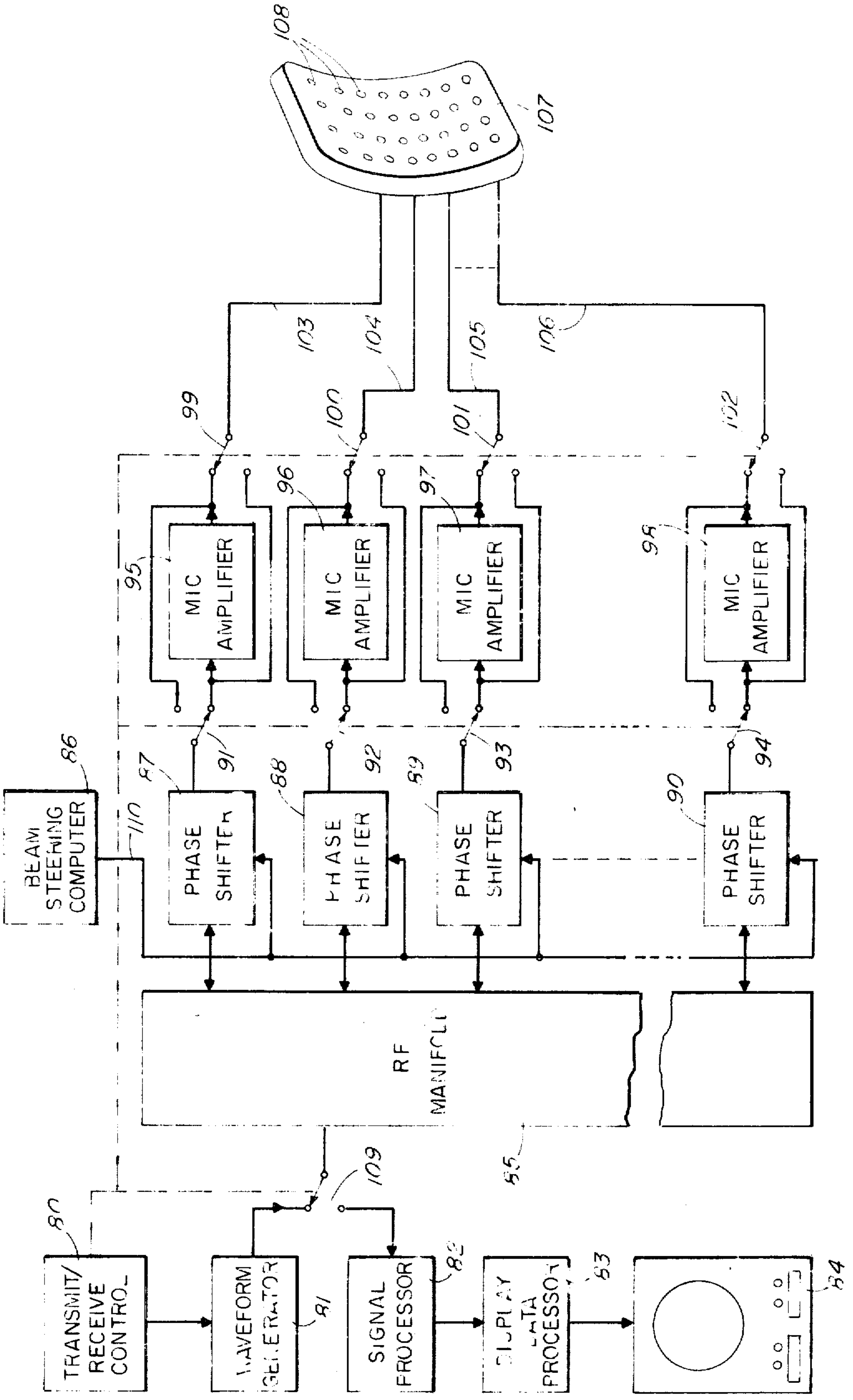
FIG. 6 is the block diagram of a phased array radar system wherein a plurality of the amplifiers shown in FIG. 4 are used.

In FIG. 6 is shown the simplified block diagram of a portion of a phased array radar system which utilizes the microwave amplifiers as disclosed in the present invention. The phased array radar system operates under the control of the transmit/receive control 80. When this control circuit 80 indicates that a pulse is to be transmitted, all of the switches 91–94, 99–102, and 109 are in the positions as shown, the waveform generator 81 produces the waveform to be amplified and sent out, for example, a linearly frequency modulated chirped pulse. This pulse is distributed by RF manifold 85 to each of the phase shifters 87–90 which may be ferrite phase shifters. The amount of phase shift to be introduced by each of the individual phase shifters is set by beam steering computer 86 on control lines 110. The phase shifted signals are coupled through switches 91–94 to the inputs of amplifiers 95–98 which here are the amplifiers as shown in FIG. 5. After the signals are amplified by these amplifiers 95–98, they are coupled through switches 99–102 on lines 103–106 respectively to phased array radar antenna 107. This phased array radar antenna 107 has a number of individual radiating elements 108 which may be 1000 or more in number in a practical phased array radar system.

When the transmit/receive control 80 indicates that the system should be switched to the receive mode of operation, all of the switches 91–94, 99–102, and 109 are put in the opposite position from that in which they are shown in the diagram of FIG. 6. The received signals are coupled from receiving elements 108 through lines 103–106 back to the inputs of amplifiers 95–98. After these signals are amplified by amplifiers 95 through 98, they are coupled back through the phase shifters 87–90 where they are given the same phase shift as that with which they were transmitted so that the received radar return may be properly reconstructed. RF manifold 85 sums the outputs from phase shifters 87–90, couples the summed signal to the signal processor 82 through switch 109. The signal processor 82 digitizes the received signals for use by display data processor 83. The digital outputs from the display data processor 83 are used to drive the radar display 84 with signals indicating the positions of the targets detected by the system.

Although preferred embodiments of the invention have been described, numerous modifications and alterations thereto would be apparent to one skilled in the art without departing from the spirit and scope of the present invention. For example, many other amplifying means other than negative resistance diodes could be used in the individual amplifying circuits. For example, power FET transistors have capabilities of producing sufficient power with sufficient frequency response to be useful in phased array radar systems as well as in microwave communication equipment and may be used to advantage with the present invention. Gunn diodes may also be used. The overall metallization pattern and layout of the individual amplifier sections may be constructed to give whatever frequency response is desired consistent with what is obtainable with available amplifying means. The actual dimensions and layout given in FIG. 1 are used by way of illustration only as these same amplifier characteristics could be achieved using other physical layouts. For example, the matching sections 20, 21, 22 and 23 could be combined to two similar although larger sections or, on the other hand, they could be split into still more sections and yet achieve the same matching properties. Also, the partitioning of the amplifier shown in FIG. 5 is again by way of illustration only as any number of different partitioning schemes may be used, as well as using either more or fewer number of stages of amplification. Finally, the illustration in the phased array radar system illustrates only one possible use for such compact microwave signal amplifiers.

What is claimed is:

1. In combination:

a sheet of ferrite material, said sheet having coupled to a surface thereto a plurality of stripline conductors and a microwave circulator, said sheet having an aperture therein, negative resistance amplifying means being positioned in said aperture;

said stripline conductors;

said negative resistance amplifying means;

said microwave circulator, said microwave circulator comprising a substantially circular conductor, first and second ones of said stripline conductors being coupled to said circular conductor and a third one of said stripline conductors being coupled to said circular conductor and to said negative resistance amplifying means; and means for providing a magnetic field through said sheet in the region of said circular conductor.

2. The combination of claim 1 wherein said means for providing a magnetic field comprises a permanent magnet, the field of said permanent magnet extending perpendicularly through said sheet of ferrite material.

3. The combination of claim 2 wherein said negative resistance amplifying means comprises an avalanche diode.

4. The combination of claim 3 wherein said sheet of ferrite material comprises yttrium iron garnet.

5. The combination of claim 3 further comprising a mounting base adjacent to said sheet of ferrite material.

6. The combination of claim 5 wherein said mounting base is copper.

* * * * *